United States Patent [19]

Read

[11] 4,014,284
[45] Mar. 29, 1977

[54] DIFFERENTIAL PRESSURE INDICATORS
[75] Inventor: Brian Read, Chester, England
[73] Assignee: Fawcett Engineering Limited, Bromborough, England
[22] Filed: Apr. 30, 1976
[21] Appl. No.: 681,954
[30] Foreign Application Priority Data
  May 6, 1975  United Kingdom ............ 19051/75
[52] U.S. Cl. ........................... 116/114 PV; 73/419; 116/DIG. 42
[51] Int. Cl.² .......................................... G01L 7/16
[58] Field of Search ......... 73/419, 38; 116/114 PV, 116/DIG. 42, DIG. 25

[56] References Cited
UNITED STATES PATENTS 3,429,291   2/1969   Hoffmann .................... 73/419
3,464,556   9/1969   Cullen ........................ 116/DIG. 42

*Primary Examiner*—Donald O. Woodiel
*Attorney, Agent, or Firm*—Woodhams, Blanchard and Flynn

[57] ABSTRACT

A differential pressure indicator for indicating the degree of contamination of a filter element, has a piston movable against a spring by increasing differential pressure and the piston is connected through a helical constraint to turn a magnetic element as the piston moves. An indicator element is located on the opposite side of a wall from the magnetic element and is magnetically coupled to it and is thereby turned by the first element as the latter turns.

5 Claims, 7 Drawing Figures

DIFFERENTIAL PRESSURE INDICATORS

The present invention relates to differential pressure indicators. Such indicators may for example be used to give an indication of the pressure drop across a filter element for a fluid and thus give an indication as to when the filter element is becoming clogged and then needs servicing or replacement.

According to the present invention there is provided a differential pressure indicator comprising a piston mounted for sliding movement in a bore, the differential pressure to be measured being in use supply across the opposite faces of the piston, resilient biasing means urging the piston in the direction of decreasing differential pressure, an angularly moveable member interconnected with the piston so that movement of the piston in the bore causes angular movement of the said member, an angularly moveable indicator element, and a fluid-tight wall between the angularly moveable member and the indicator element, the angularly moveable member and the indicator element being magnetically coupled so that angular movement of the angularly moveable member in response to a change in the differential pressure causes an appropriate angular movement of the indicator element.

The angularly moveable member is conveniently connected to the piston by a helical constraint. This constraint may comprise a twisted prismatic or other non-circular section rod extending slidably but nonrotatably through an appropriate non-circular hole in an element fixed against rotation. In one embodiment, the rod is fixed in the piston which is thereby constrained to rotate as it moves along the bore and the rotation of the rod may be applied to the indicator element by appropriate non-circular interfitting portions of the rod an angularly moveable element. Alternatively, the rod and piston may be prevented from rotating about the axis of the piston and a helical twisted portion of the rod can then be engaged in a suitably shaped non-circular hole in the portion of the angularly moveable element, the latter being constrained against axial movement.

An embodiment of the invention will now be described by way of example with reference to the accompanying drawings, in which:

FIG. 1 is a vertical section through the head or cap structure of a filter unit incorporating a detachable bowl and filter element (not shown), FIG. 2 shows part of a vertical section at right angles to FIG. 1, in the plane of the line II—II of FIG. 1, FIG. 3 is an end view of the left-hand portion of the indicator device shown in FIG. 1, as seen in the direction of the arrow 3, FIG. 4 shows part of the left-hand portion of FIG. 1 on an enlarged scale;

Figure 1:
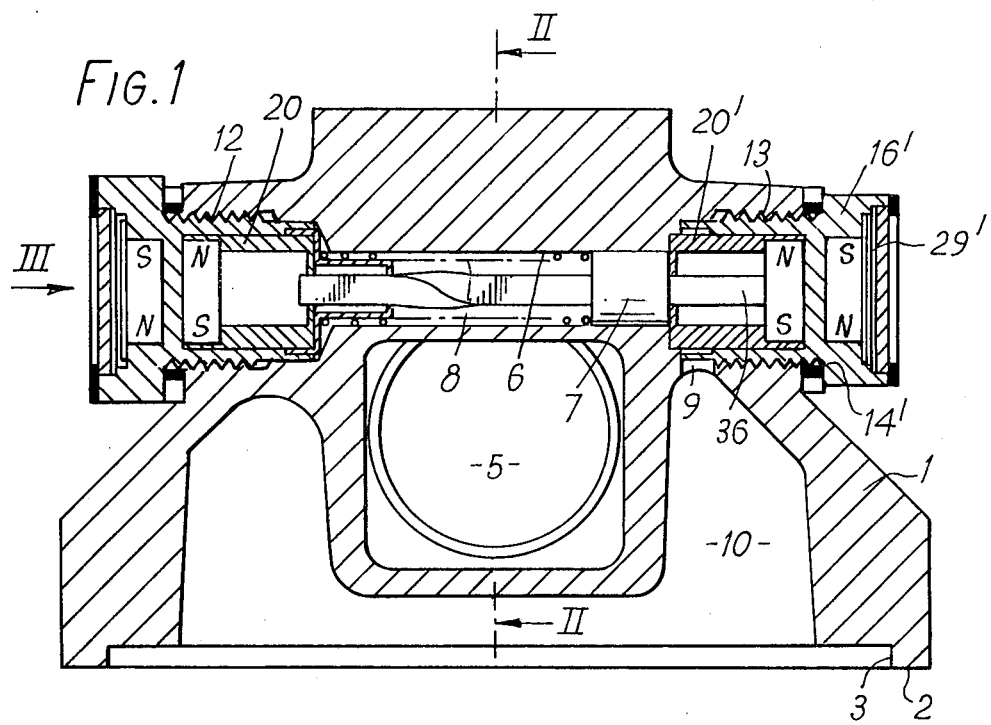

Referring to the drawings, the filter has a cap structure 1 having an annular lower face 2 formed with a shoulder 3 to receive a sealing ring and also a filter bowl (not shown) can be bolted up against the face 2 and in use contains a disposable pleated paper filter element (not shown).

The cap 1 is formed with threaded bores 4 and 5 for connection to outlet and inlet pipes for the fluid to be filtered.

Figure 2:
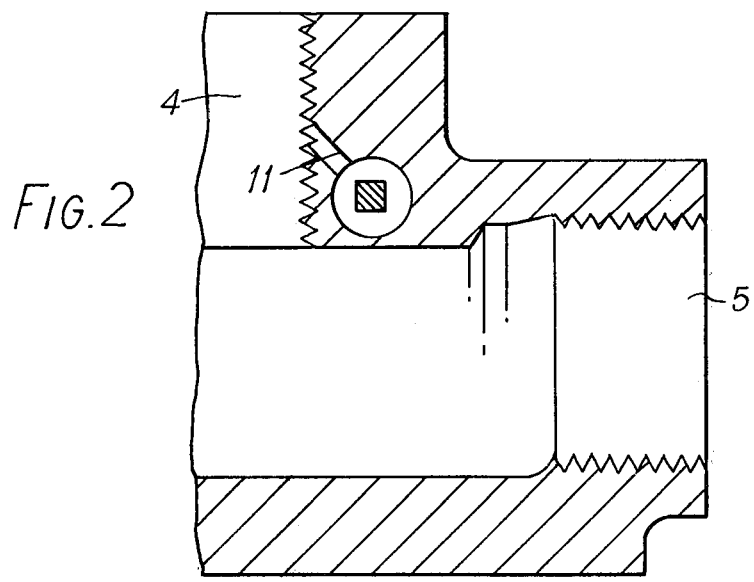

A cross bore 6 extends through the cap 1 near the top connection 4 and a piston 7 is slidably mounted in the bore 6. A spring 8 (FIG. 1) urges the piston 7 to the right (as seen in FIG. 1). A passage 9 connects the right-hand face of the piston 7 with the fluid space 10 in the cap which is connected to the supply pressure while a further passage 11 (FIG. 2) connects the portion of the bore 6 to the left of the piston in FIG. 1 to the top, outlet connection 4 (in a position adjacent the middle of the bore 6).

The two ends of the bore 6 are of enlarged diameter at 12 and 13.

Figure 4:
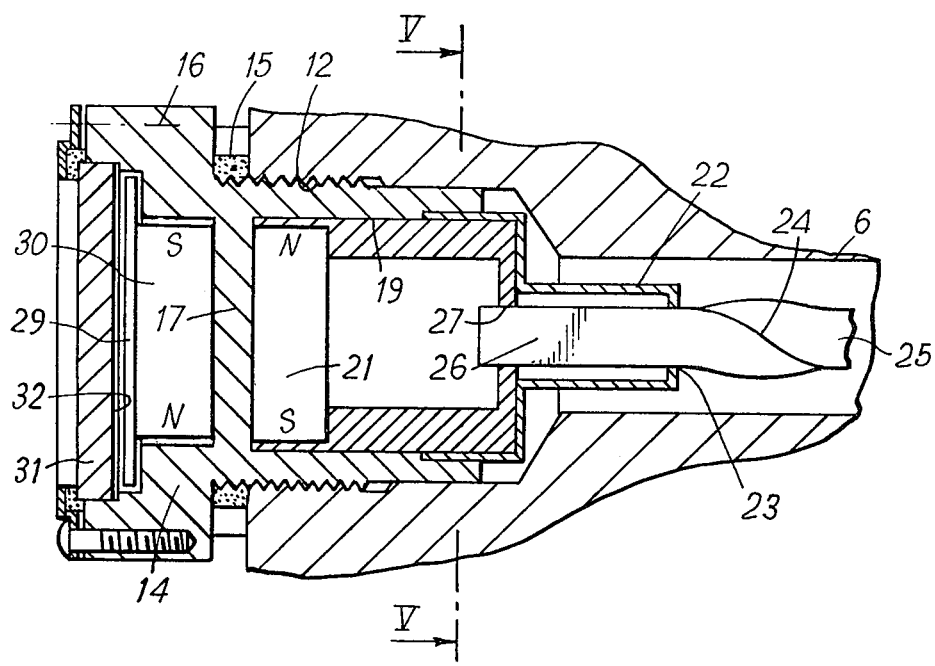
Figure 5:
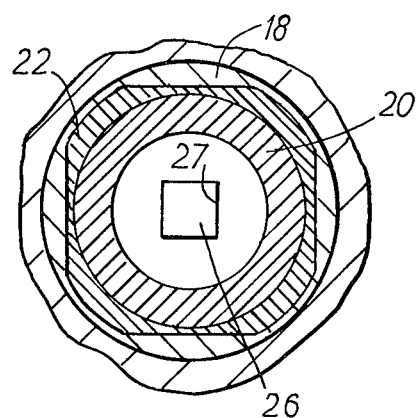
FIG. 5 is a cross-section through FIG. 4 on the line V-V.

Referring to FIGS. 4 and 5, it will be seen that the enlarged bore portion 12 receives a housing 14 with a sealing ring 15 under the head 16 of the housing 14 which has an end wall 17 for the bore 6 and is of nonmagnetic material.

The housing 14 has a sleeve portion 18 received in the bore portion 12 and definding a cylindrical chamber 19 containing an angularly moveable member 20 one end of which contains a permanent magnet 21 adjacent the wall 17. The angularly moveable member 20 is held captive (but free for rotation) in the chamber 19 by a pressing 22 the end wall 23 of which has a square hole through which a helically twisted portion 24 of a rod 25 is slidable. Since the pressing 22 is fixed against rotation and against axial movement, axial movement of the rod 25 through the hole 23 causes the rod 25 to rotate. This rotation is applied to the angularly moveable member 20 by a straight, untwisted portion 26 of the rod 25 which extends through a corresponding square hole 27 in an end wall 28 of the hollow angularly moveable member 20.

The twisted rod 25 may be fixed to the piston 7 so that the latter rotates as it moves along the bore 6. In this case, an anti-friction washer for example of polytetrafluoroethylene is preferably placed between the spring 8 and the piston 7. Alternatively, the rod 25 may be free to rotate in the piston while moving axially with it. Another possibility would be for the portion 26 of the rod 25 to be twisted while the portion 24 would be untwisted.

Figure 3:
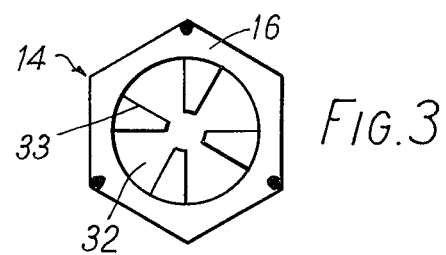

Whichever arrangement is adopted, the piston 7, in use, has the pressure at the inlet 5 applied to its right-hand end (as seen in FIG. 1) and the pressure at its top, outlet 4 apply to its left-hand end. The piston 7 can thus measure the differential pressure between the connections 4 and 5 by moving to an equilibrium position against the action of the spring 8. This movement will result in an angular movement of the member 20. By arranging a rotatable indicating element 29, also containing magnetic material such as a permanent magnet 30, on the opposite side of the wall 17, the magnetic interaction between the two magnets 21 and 30 will cause the indicator element 29 to follow the angular movement of the angularly moveable member 20. Preferably, the indicator element 29 is protected by a glass 31 carrying a mask 32 which, as shown in FIG. 3 may have segments such as 33 cut out to reveal the indicating element 29 which has differently coloured segments indicating the magnitude of the differential pressure across the piston and thus the state of the filter element. The indicator element may for example have a green segment which is visible when the filter element is in good condition, an orange segment which is visible when the differential presssure increases to a value requiring changing or servicing of the filter element at the next convenient opportunity and a red segment indicating that the filter element is totally blocked and should be changed immediately. To assist in giving a clear indication, the shaft 25 may have two spaced helical portions separated by a short untwisted section, each twisted portion corresponding to the position of the piston at which a change from one indication to the next is to be made, the straight portions between and on either side of the twisted portions giving a "dwell" in which further movement of the piston does not cause rotation of the member 20 or indicator element 29.

As can be seen at the right-hand part of FIG. 1, the indicating arrangement is duplicated with a further housing 16' in the bore portion 13 and containing a second angularly moveable member 20' and a second indicating element 29'. The shaft 25 is continued to the right of the piston 7 by portion 36 which is untwisted if the piston 7 rotates as it moves or twisted if the piston 7 is prevented from rotating.

Figure 6:
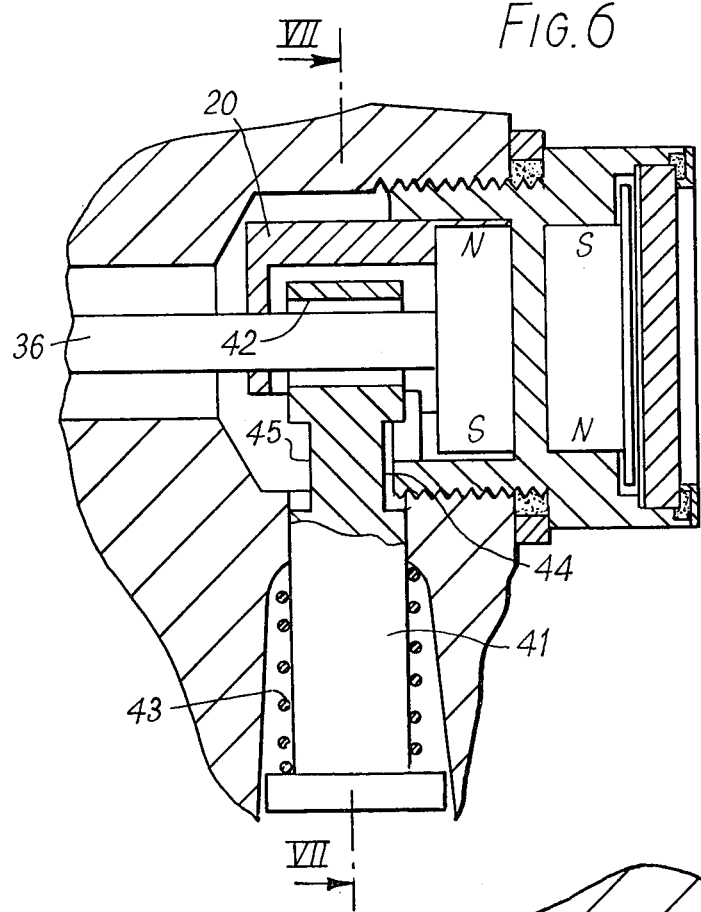
FIG. 6 is a view corresponding to the right-hand portion of FIG. 1, but on an enlarged scale and showing a modification.
Figure 7:
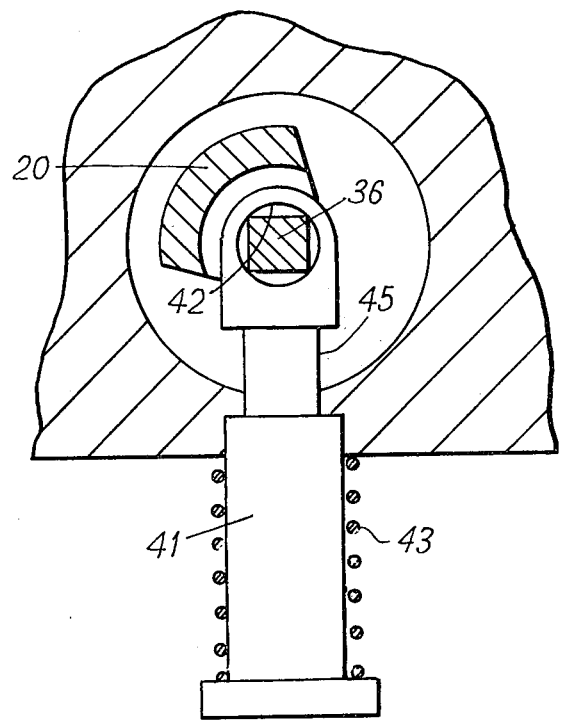
FIG. 7 is a section on the line VII—VII of FIG. 6.

FIGS. 6 and 7 show a modification applied to this right-hand portion of FIG. 1 which prevents the indicator from returning to its original position after the differential pressure has increased to a value requiring changing of the filter element. In this modification, a portion of the side wall of the member 20' is cut away to receive an end of a plunger 41 having a bore 42 through which the end of the shaft 36 can pass. The plunger 41 is urged downwards by a spring 43 but is prevented from moving downwards when the shaft end 36 is engaged in the bore 42. When however the piston has moved sufficiently far to the left (FIG. 6) to free the shaft 36 from the bore 42, the plunger 41 moves downwards through a distance determined by engagement of an edge 44 of the housing 14' in a groove 45 in the plunger 41. In this position, the upper end of the plunger 41 blocks return movement of the shaft 36 until the plunger 41 is pushed upwards to enable the shaft 36 to be re-engaged in the bore 42. The plunger 41 is only accessible for this operation when the filter bowl and filter element have been removed.

I claim:

1. A differential pressure indicator including a piston mounted for sliding movement in a bore, the differential pressure to be measured being in use supplied across the opposite faces of the piston, and resilient biasing means urging the piston in the direction of decreasing differential pressure, wherein the indicator further comprises an angularly moveable member interconnected with the piston so that movement of the piston in the bore causes angular movement of said member, and angularly moveable indicator element, and a fluid-tight wall between the angularly moveable member and the indicator element, the angularly moveable member and the indicator element being magnetically coupled so that angular movement of the angularly moveable member in response to a change in the differential pressure causes an appropriate angular movement of the indicator element.

2. An indicator according to claim 1, wherein the angularly moveable member is connected to the piston by a helical constraint.

3. An indicator according to claim 2, wherein the said constraint comprises a twisted prismatic or other non-circular section rod extending slidably but non-rotatably through an appropriate non-circular hole in an element fixed against rotation.

4. An indicator according to claim 3, wherein the rod is fixed in the piston which is thereby constrained to rotate as it moves along the bore and the rotation of the rod is applied to the indicator element by appropriate non-circular interfitting portions of the rod and angularly moveable element.

5. An indicator according to claim 3, wherein the rod and piston are prevented from rotating about the axis of the piston and a helical twisted portion of the rod is engagaed in a suitably shaped noncircular hole in the portion of the angularly moveable element, and the angularly moveable element is constrained against axial movement.

* * * * *